(12) United States Patent
Falk et al.

(10) Patent No.: US 11,187,889 B2
(45) Date of Patent: Nov. 30, 2021

(54) PHASE-CHANGE SPATIAL LIGHT MODULATOR

(71) Applicant: International Business Machines Corporation, Armonk, NY (US)

(72) Inventors: Abram L. Falk, Port Chester, NY (US); Jessie C. Rosenberg, Mount Vernon, NY (US); Damon B. Farmer, White Plains, NY (US); William Green, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 16/397,549

(22) Filed: Apr. 29, 2019

(65) Prior Publication Data

US 2020/0341264 A1    Oct. 29, 2020

(51) Int. Cl.
G02B 26/06    (2006.01)
G02B 26/02    (2006.01)
G02B 6/02     (2006.01)

(52) U.S. Cl.
CPC ......... *G02B 26/06* (2013.01); *G02B 6/02033* (2013.01); *G02B 26/02* (2013.01)

(58) Field of Classification Search
CPC .............. G02B 26/0833; G02B 26/001; G02B 26/0841; G02B 26/02; G02B 26/06; G02B 26/0816; G02B 26/00; G02B 26/005; G02B 27/0068; G02B 26/08; G02B 26/0825; G02B 2027/0178; G02B 26/0808; G02B 27/0172; G02B 27/0927; G02B 27/0977; G02B 27/42; G02B 3/14; G02B 1/005; G02B 2027/014; G03F 7/70116; G03F 7/70058; G03F 7/70291; G03F 7/70075; G03F 7/70108; G03F 7/70141; G03F 7/70158; G03F 7/70191; G03F 7/70566; G03F 7/7015; G03F 7/0007; G03F 7/20; G03F 7/40; G03F 7/70025; G03F 7/70066; G03F 7/70083;
(Continued)

(56) References Cited

U.S. PATENT DOCUMENTS 6,819,469 B1    11/2004   Koba
6,859,293 B2    2/2005    Klug et al.
(Continued)

FOREIGN PATENT DOCUMENTS

WO    9947983 A1      9/1999
WO    2016151317 A1   9/2016
WO    2017221028 A1   12/2017

OTHER PUBLICATIONS

Chu, C. H., et al., "Active dielectric metasurface based on phase-change medium", Laser Photonics Rev., Nov. 2016, pp. 986-994, 10, No. 6.
(Continued)

*Primary Examiner* — William R Alexander
*Assistant Examiner* — Sharrief I Broome
(74) *Attorney, Agent, or Firm* — Scully, Scott, Murphy & Presser, P.C.; Daniel P. Morris, Esq.

(57) ABSTRACT

A spatial light modulator (SLM) is provided that includes an optical resonator (i.e., pixel) having nanoscale size. The optical resonator having nanoscale size includes a phase-change material such as, for example, a GeSbTe alloy, sandwiched between silicon nitride cladding layers. The phase-change material can undergo a crystalline-to-amorphous phase transition which is characterized by a large change in optical properties of the resonator.

15 Claims, 5 Drawing Sheets

(58) Field of Classification Search
CPC .. G03F 7/70091; G03F 7/70133; G03F 7/702; G03F 7/70216; G02F 1/0131; G02F 1/0128; G02F 2202/32; G02F 1/0072; G02F 1/21; G02F 1/29; G02F 1/0018; G02F 1/0147; G02F 1/03; G02F 1/092; G02F 1/009; G02F 1/0121; G02F 1/0123; G02F 1/076; G02F 1/1313; G02F 1/13306; G02F 1/133526; G02F 1/15165; G02F 1/155; G02F 1/19; G09G 3/3466; G09G 3/346; G09G 3/2003; G09G 3/3433; G09G 5/003; G09G 2300/0426; G09G 2300/0473; G09G 2300/0842; G09G 2300/0465; G09G 2300/0838; G09G 2300/0857; G09G 2300/0866; G09G 2300/0876; G09G 2310/0235; G09G 2310/0237; G09G 2310/0272; G09G 2310/063; G09G 2320/0242; G09G 2340/0492; G09G 2360/144; H01L 2924/00; H01L 2224/48091; H01L 2924/0002; H01L 2924/1461; H01L 27/3232; H01L 2924/00014; H01L 2224/48227; H01L 2251/308; H01L 2251/5323; H01L 2251/5338; H01L 23/38; H01L 27/1214; H01L 27/124; H01L 27/1248; H01L 27/1259; H01L 27/32; H01L 27/3225; H01L 27/3241; H01L 27/3244; H01L 27/326

See application file for complete search history.

(56) References Cited

U.S. PATENT DOCUMENTS

| | | |
|---|---|---|
| 6,859,304 B2 | 2/2005 | Miller et al. |
| 9,470,955 B2 | 10/2016 | Pernice et al. |
| 10,374,103 B1* | 8/2019 | Carta .............. H01L 29/872 |
| 2001/0028483 A1 | 10/2001 | Buse |
| 2007/0148855 A1* | 6/2007 | Chen .............. H01L 45/16 438/238 |
| 2009/0130797 A1* | 5/2009 | Lee .............. H01L 45/1616 438/102 |
| 2011/0097825 A1* | 4/2011 | Cheng .............. H01L 45/1226 438/14 |
| 2011/0273756 A1 | 11/2011 | Wang et al. |
| 2012/0127562 A1 | 5/2012 | Kim et al. |
| 2016/0223723 A1* | 8/2016 | Han .............. G02B 5/008 |
| 2017/0168327 A1* | 6/2017 | Han .............. G02F 1/061 |
| 2020/0081275 A1* | 3/2020 | Kim .............. G02B 26/02 |

OTHER PUBLICATIONS

Au, Y.-Y., et al., "Phase-change devices for simultaneous optical-electrical applications", Scientific Reports, Published online Aug. 29, 2017, 7 pages, 7: 9688.

Lee, S.-Y., et al., "Holographic image generation with a thin-film resonance caused by chalcogenide phase-change material", Scientific Reports, Published online Jan. 24, 2017, 8 pages, 7:41152.

Cao, T., et al., "Ultrafast beam steering using gradient Au—Ge2Sb2—Te5—Au plasmonic resonators", Optical Society of America, Jul. 13, 2015, 11 pages, vol. 23, No. 14.

Karvounis, A., et al., "All-dielectric phase-change reconfigurable metasurface", Applied Physics Letter, published online Aug. 2, 2016, pp. 051103-1 to 051103-5, 109.

Hosseini, P., et al., "An optoelectronic framework enabled by low-dimensional phase-change films", Nature, Jul. 10, 2014, pp. 206-211, vol. 511.

Lee, S.-Y., et al., "Design Method of Tunable Pixel with Phase-Change Material for Diffractive Optical Elements", ETRI Journal, Jun. 2017, pp. 390-397, vol. 39, No. 3.

* cited by examiner

PHASE-CHANGE SPATIAL LIGHT MODULATOR

BACKGROUND

The present application relates to a spatial light modulator having a nanoscale pixel pitch, and more particularly to a spatial light modulator that includes an optical resonator that contains a phase change material (PCM).

A key frontier of modern optics research is the development of technologies that can project arbitrary three-dimensional (3D) electromagnetic fields in free space. Although rapid advances in planar optics and metasurfaces have led to exceptional control over static electromagnetic fields, tunable planar optics has lagged far behind, particularly in the visible domain. A spatial light modulator (SLM) with a nanoscale pixel pitch would allow dynamic light-field control and therefore be a foundation for a variety of new technologies. These include holographic displays, three-dimensional sensing systems such as lidar and face recognition, free-space beam steering and pulse shaping, and tunable planar lenses.

The need for an SLM with nanoscale pixel size derives from the maximum diffraction angle of a spatial light modulator, $\arcsin(\lambda/2p)$, where $\lambda$ is the wavelength of the light being projected and p is the pitch of the array. Current state-of-the-art spatial light modulators at visible and near-IR wavelengths, are based on liquid-crystal-on-silicon (LCoS) technology and have proven extremely difficult to miniaturize below p=3.5 µm. Near-IR phased arrays based on silicon photonics are similarly limited to super-wavelength pitches due to interference between neighboring waveguides. Diffraction angles have thus been limited to only a few degrees, which is too small for workstation holographic displays or three-dimensional sensors.

SUMMARY

A spatial light modulator (SLM) is provided that includes an optical resonator (i.e., pixel) having nanoscale size. The optical resonator having nanoscale size includes a phase change material such as, for example, a GeSbTe alloy, sandwiched between silicon nitride cladding layers. The phase change material can undergo a crystalline-to-amorphous phase transition which is characterized by a large change in optical properties.

In one aspect of the present application, a spatial light modulator (SLM) is provided. In one embodiment of the present application, the SLM includes an optical resonator including a layer of a phase change material sandwiched between a first cladding layer of silicon nitride and a second cladding layer of silicon nitride.

In some embodiments, the SLM can further include an electrode located on a back side of the optical resonator, and a heating element composed of a metal nitride located on a front side of the optical resonator. In other embodiments, the SLM can further include a heating element composed of a metal nitride located on a back side of the optical resonator, and a front side of the optical resonator is physically exposed (i.e., bare).

In one exemplary embodiment, an SLM is provided that includes an optical resonator including a layer of a GeSbTe alloy (GST) sandwiched between a first cladding layer of silicon nitride and a second cladding layer of silicon nitride.

In some embodiments, the SLM including the GST alloy can further include an electrode located on a back side of the optical resonator, and a heating element composed of a metal nitride located on a front side of the optical resonator. In other embodiments, the SLM including the GST alloy can further include a heating element composed of a metal nitride located on a back side of the optical resonator, and a front side of the optical resonator is physically exposed (i.e., bare).

DETAILED DESCRIPTION

Figure 1:
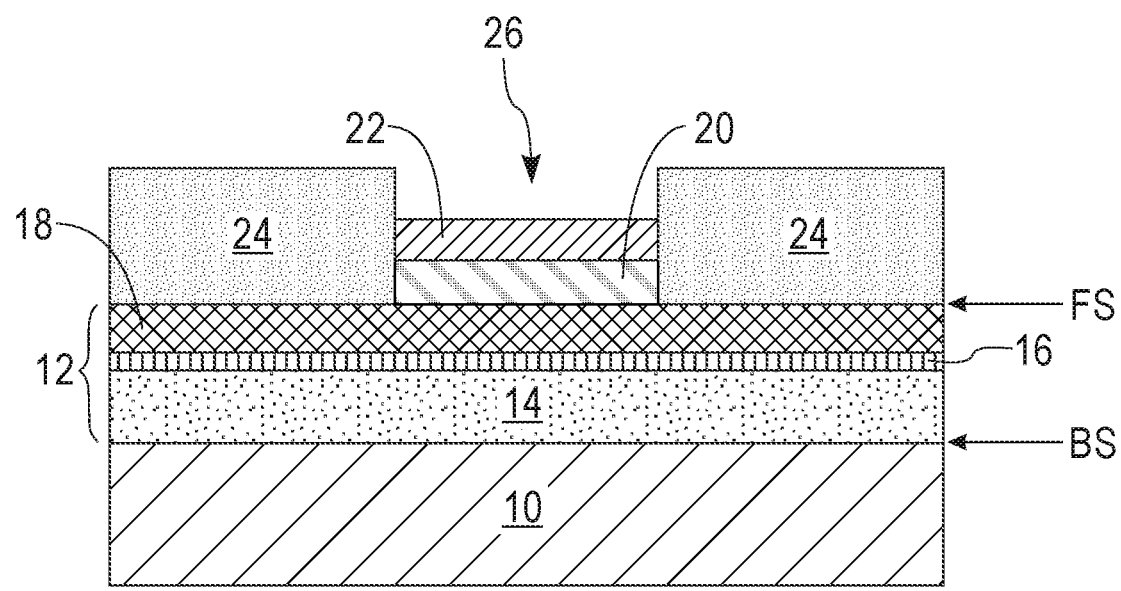
FIG. 1 is a cross sectional view of a spatial light modulator in accordance with an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

In the present application, and to provide a spatial light modulator (SLM) having an optical pixel size, a phase change material is incorporated into an optical resonator. Unlike liquid crystals, pixels comprising a phase change material (PCM) can be scaled to the true nanoscale. Reliable switching of the phase change material at single-nm pixel sizes has been established by the phase change memory industry. Because phase change materials are also nonvolatile, they could also be a foundation for nonvolatile photonic devices and reflective displays that don't consume energy when a static picture is being shown.

However, in spite of the maturity of PCM in both the optics industry (rewritable DVDs) and semiconductor industry (PCM memory), the electrical switching of an optically detectable PCM pixels (so-called "mixed mode" switching) is very immature. This immaturity is due to a number of challenges. Many of these derived from the size of "mixed mode" pixels. Unlike in PCM memory, the cell size of an electrically switched PCM pixel will typically not be scaled down to the deep subwavelength scale. Rather, for diffractive optics applications, the dimension of a PCM pixel will be hundreds of nanometers, the same length scale as the wavelength of light.

Thus, due to this pixel size, the power requirements for mixed mode switching can be high. It requires very high temperatures to switch PCM (about 600° C. for $Ge_2Sb_2Te_5$) from its crystalline to amorphous state. The amorphous to crystalline transition also has a high total switching energy. Moreover, in order for the melt-quenching process to successfully transform a pixel of crystalline PCM to amorphous PCM, the pixel must be cooled very quickly (in less than 30 ns). Thus, the PCM cell must be thermally well-grounded. The larger size of mixed-mode PCM pixels relative to a PCM memory pixel also makes achieving this grounding and cooling rate a challenge.

Another challenge is that PCMs can suffer from filamentation when they are directly driven with current. When a PCM cell that is initially in the amorphous state is Joule heated, crystalline filaments can form. These have a much higher conductivity than the amorphous PCM, and thus current preferentially flows through these filaments. The overall PCM cell thus does not uniformly crystallize. This sort of filamentation can be a particular problem in optics, as a non-uniform PCM cell will have an unpredictable optical response.

Finally, unlike in PCM memory, where the PCM can be buried by opaque metal, a mixed mode-PCM pixel must be optically accessible.

Figure 2:
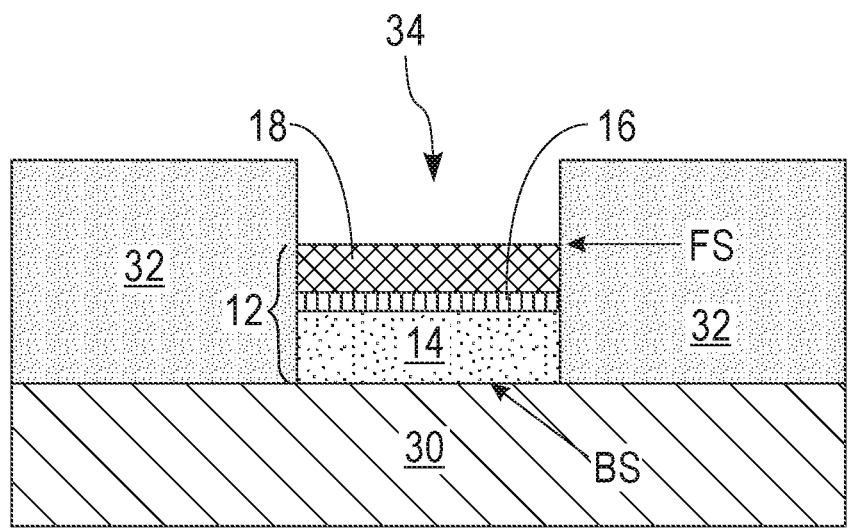
FIG. 2 is a cross sectional view of another spatial light modulator in accordance with another embodiment of the present application.

Reference is now made to FIGS. 1-2, which illustrate spatial light modulators (SLMs) in accordance with various embodiments of the present application. Although a single SLM is shown for each embodiment, a plurality of SLMs in accordance with the present application can be located laterally adjacent to each other forming an array of SLMs.

Each of the SLMs of the present application includes an optical resonator 12. Although a single optical resonator 12 is shown for each embodiment, a plurality of optical resonators 12 in accordance with the present application can be located laterally adjacent to each other forming an array of optical resonators 12 in an SLM. The optical resonator 12 may also be referred to as an optical cavity or resonating cavity. The optical resonator 12 serves as a pixel of the SLM. The pixel is nanoscale in later dimensions. By "nanoscale" it is meant that the in-plane dimensions of the optical resonator 12 are 1000 nm or less. In one embodiment, the total thickness of the optical resonator 12 is from 100 nm to 300 nm. The optical resonator 12 of the present application includes a layer of a phase change material 16 sandwiched between a first cladding layer of silicon nitride 14 and a second cladding layer of silicon nitride 18.

Each of the first cladding layer of silicon nitride 14 and the second cladding layer of silicon nitride 18 can have a thickness from 5 nm to 200 nm. It is noted that the thickness of the cladding layer that is closest to the heating element (to be defined in greater detail herein below) can be preselected to provide tunability to the layer of phase change material 16. In one embodiment of the present application, the first cladding layer of silicon nitride 14 has a first thickness, while the second cladding layer of silicon nitride 18 has a second thickness that is the same or different from the first thickness. In one example, the first thickness of the first cladding layer of silicon nitride 14 is from 10 nm to 1000 nm, and the second thickness of the second cladding layer of silicon nitride 18 is from 5 nm to 200 nm.

The first cladding layer of silicon nitride 14 and the second cladding layer of silicon nitride 18 can be formed utilizing a deposition process including, but not limited to, chemical vapor deposition (CVD), plasma enhanced chemical vapor deposition (PECVD), atomic layer deposition (ALD) or physical vapor deposition (PVD). It is noted that the use of silicon nitride as the first and second cladding layers (14, 18) of the optical resonator 12 permits the layer of phase change material 16 to melt rapidly and undergo a facile transition from a crystalline state to an amorphous state.

The layer of phase change material 16 can be composed of any material that can retain separate amorphous and crystalline states. That is the phase change materials that can be employed in the present application undergo a crystalline-to-amorphous phase transition which is characterized by a large change in optical properties. Such materials require a high temperature (greater than 600° C.) to undergo a crystalline-to-amorphous phase transition.

In one embodiment of the present application, the layer of phase change material 16 is composed of a chalcogenide. Chalcogenides are composed of an element from Group 16 (i.e., a chalcogen) of the Periodic Table of Elements and a more electropositive element. In some embodiments, the chalcogenide is non-doped. In other embodiments, the chalcogenide can be doped with another element such as, for example, Si or $SiO_2$. Examples of chalcogens that can be used to provide the layer of phase change material 16 include, but are not limited to, a GeSbTe alloy (GST), a SbTe alloy, GeTe alloy, an InSe alloy or a AgInSbTe alloy. In one embodiment, a GST alloy such as, for example, $Ge_2Sb_2Te_5$ or $Ge_2Sb_1Te_4$ is used as the layer of phase change material 16.

The layer of phase change material 16 can be forming utilizing a deposition process such as, for example, chemical vapor deposition (CVD), plasma enhanced chemical vapor deposition (PECVD) or atomic layer deposition (ALD). The layer of phase change material 16 has a film thickness that is selected to ensure optical transparency through the optical resonator 12. In one embodiment, the layer of phase change material 16 can have a thickness from 5 nm to 30 nm.

The optical resonator 12 of the present application can be formed by first depositing the first cladding layer of silicon nitride 14, second depositing the layer of phase change material 16, and third depositing the second cladding layer of silicon nitride 18. In some embodiments, a patterning process may follow the sequential deposition of each of the first cladding layer of silicon nitride 14, the layer of phase change material 16, and the second cladding layer of silicon nitride 18. Patterning may include photolithography and etching, or any other patterning process known to those skilled in the art. In other embodiments, no patterning process is employed after the sequential deposition of each of the first cladding layer of silicon nitride 14, the layer of phase change material 16, and the second cladding layer of silicon nitride 18.

In the present application, the layer of phase change material 16 has a first surface that forms a first interface with the first cladding layer of silicon nitride 14, and a second surface, opposite the first surface, that forms a second interface with the second cladding layer of silicon nitride 18.

The optical resonator 12 of the present application has a back side, BS, and a front side, FS, which is opposite the back side, BS. The back side, BS, of the optical resonator 12 is defined by a bottommost surface of the first cladding layer of silicon nitride 14, while the front side, FS, of the optical resonator 12 is defined by a topmost surface of the second cladding layer of silicon nitride 18.

In some embodiments, and as shown in FIG. 1, an electrode 10 is located on the back side, BS, of the optical resonator 12, and a heating element 20 composed of a metal nitride is located on the front side, FS, of the optical resonator 12; the heating element 20 is transparent due to the selected thickness of the metal nitride used to provide the same. A protective layer of silicon nitride 22 can be formed on a physically exposed surface of the heating element 20. The heating element 20 and the protective layer of silicon nitride 22 are typically located within a cavity 26 of a metal nitride structure 24.

In the illustrated embodiment shown in FIG. 1, the electrode 10 forms an interface with an entirety of the bottommost surface of the first cladding layer of silicon nitride 14, while the heating element 20 forms an interface with a portion of a topmost surface of the second cladding layer of silicon nitride 18.

The electrode 10 that can be employed in this embodiment of the present application is composed of a thermally conductive metal or metal nitride. Examples of thermally conductive metals or metal nitrides that can be used as the electrode 10 include, but are not limited to, platinum (Pt), tungsten (W), titanium nitride (TiN), and tantalum nitride (TaN). The electrode 10 has a sufficient thickness such that it serves as a back plane mirror of the SLM shown in FIG. 1. The electrode 10 can be formed utilizing a deposition process such as, for example, chemical vapor deposition (CVD), plasma enhanced chemical vapor deposition (PECVD), atomic layer deposition (ALD), sputtering, or plating. The optical resonator 12, as defined above, is then formed on a physically exposed surface of the electrode 12. The electrode 10 can have a thickness from 50 nm to 200 nm; although other thicknesses can be used as the thickness of the electrode 10 as long as the selected thickness of electrode 10 is thick enough such that electrode 10 is refelective.

Although not shown, the electrode 10 can be formed on a surface of a base substrate. The base substrate may include at least one semiconductor material having semiconducting properties. Examples of semiconductor materials that can be used as the base substrate include, but are not limited to, silicon, a silicon germanium alloy, germanium, a III-V compound semiconductor or a II-VI compound semiconductor. In one example, the base substrate is composed of silicon. The base substrate may include one or more semiconductor devices such as, for example, transistors, resistors, light emitting diodes or laser formed thereon.

For the embodiment illustrated in FIG. 1, a heating element 20 composed of a metal nitride is located on the front side, FS, of the optical resonator 12. The metal nitride that provides the heating element 20 serves as a partially reflective top mirror and as a heater. The metal nitride that provides the heating element 20 is composed of a refractory metal nitride having a high melting point (i.e., greater than 2500° C.) which can withstand the high heat that is needed to cause phase transition of the layer of phase change material 16, and is at least 50% transparent. Examples of refractory metal nitrides that can be used as the heating element 20 include, but are not limited to, titanium nitride or tantalum nitride. The heating element 20 can be formed by a deposition process and patterning. Heating element 20 can be deposited by chemical vapor deposition (CVD), plasma enhanced chemical vapor deposition (PECVD), atomic layer deposition (ALD), sputtering, or plating. The thickness of heating element 20 is such that the heating element 20 is at least 50% transparent. In one embodiment, the heating element 20 can have a thickness from 5 nm to 30 nm.

Although not shown, the heating element 20 is connected to a source that can supply a voltage pulse to the heating element 20 such that heat is generated by the heating element 20. This generated heat then propagates into the layer of phase change material 16 causing the phase change transition from a crystalline state to an amorphous state. By turning off the voltage pulse and cooling the device back to normal operational temperature, the layer of phase change material 16 is switched from the amorphous state to the crystalline state. The heating and cooling and thus the phase transition is rapid (i.e., less than 30 ns, typically 10 ns or less).

The protective layer of silicon nitride 22 is located on a physically exposed surface of the heating element 20 that is opposite the surface of the heating element 20 that forms an interface with the second cladding layer of silicon nitride 18. The protective layer of silicon nitride 22 protects the heating element 20 from undergoing oxidation during use. The protective layer of silicon nitride 22 can be formed utilizing one of the deposition processes mentioned above for forming the first cladding layer of silicon nitride 14. In the present application, a blanket layer of the heating element 20 is first deposited, a blanket layer of the protective layer of silicon nitride 22 is second deposited, and thereafter the blanket layer of the protective layer of silicon nitride 22 and the blanket layer of the heating element 20 are patterned. The protective layer of silicon nitride 22 can have a thickness from 5 nm to 50 nm.

The metal nitride structure 24 having cavity 26 can then be formed on the physically exposed surface of the second cladding layer of silicon nitride 18 and the patterned material stack of the heating element 20 and the protective layer of silicon nitride 22. The metal nitride structure 24 can be formed by depositing a layer of a metal nitride and then a patterning process such as, for example lithography and etching, can be used to form the cavity 26 into the layer of metal nitride. The metal nitride structure 24 may include one of metal nitrides mentioned above for the heating element 20. In some embodiments of the present application, the metal nitride structure 24 is composed of a compositionally same metal nitride as the heating element 20. In one example, the metal nitride structure 24 and the heating element 20 are both composed of titanium nitride. In other embodiments of the present application, the metal nitride structure 24 is composed of a compositionally different metal nitride than the heating element 20. In one example, the metal nitride structure 24 is composed of tantalum nitride and the heating element 20 is composed of titanium nitride. The metal nitride structure 24 is selected to have a thickness such that metal nitride structure 24 is not transparent. In one embodiment, the metal nitride structure 24 can have a thickness from 100 nm to 1000 nm.

For the embodiment illustrated in FIG. 2, a heating element 30 composed of a metal nitride is located on the back side, BS, of the optical resonator 12. The metal nitride that provides the heating element 30 serves as a partially reflective back plane mirror and as a heater. The metal nitride that provides the heating element 30 is composed of a refractory metal nitride as defined above for heating element 20. Examples of refractory metal nitrides that can be used as the heating element 30 include, but are not limited to, titanium nitride or tantalum nitride. The heating element 30 can be formed by a deposition process such as, for example, chemical vapor deposition (CVD), plasma enhanced chemical vapor deposition (PECVD), atomic layer deposition (ALD), sputtering, or plating. The heating element 30 has a sufficient thickness to be reflective.

Although not shown, the heating element 30 is connected to a source that can supply a voltage pulse to the heating element 30 such that heat is generated by the heating element 30. This generated heat then propagates into the layer of phase change material 16 causing the phase change transition from a crystalline state to an amorphous state. By turning off the voltage pulse and cooling the device back to normal operational temperature, the layer of phase change material 16 is switched from the amorphous state to the crystalline state. The heating and cooling and thus the phase transition is rapid (i.e., less than 30 ns, typically 10 ns or less).

Although not shown, the heating element 30 can be formed on a surface of a base substrate. The base substrate may include at least one semiconductor material having semiconducting properties. Examples of semiconductor materials that can be used as the base substrate include, but are not limited to, silicon, a silicon germanium alloy, germanium, a III-V compound semiconductor or a II-VI compound semiconductor. In one example, the base substrate is composed of silicon. The base substrate may include one or more semiconductor devices such as, for example, transistors, resistors, light emitting diodes or laser formed thereon.

In the embodiment shown in FIG. 2, the optical resonator 12 is located in a cavity 34 that is present in a metal nitride structure 32. The front side, FS, of the optical resonator 12 is physically exposed (i.e., bare). In this embodiment, blanket layers of the first cladding layer, the layer of phase change material, and the second cladding layer are first deposited. The blanket deposited layers are then patterned to provide the patterned optical resonator 12 shown in FIG. 2. The metal nitride structure 32 can then be formed by depositing a layer of a metal nitride and then a patterning process such as, for example, lithography and etching, can be used to form the cavity 34 into the layer of metal nitride. The metal nitride structure 32 may include one of metal nitrides mentioned above for the heating element 30. In some embodiments of the present application, the metal nitride structure 32 is composed of a compositionally same metal nitride as the heating element 30. In one example, the metal nitride structure 32 and the heating element 30 are both composed of titanium nitride. In other embodiments of the present application, the metal nitride structure 32 is composed of a compositionally different metal nitride than the heating element 30. In one example, the metal nitride structure 32 is composed of tantalum nitride and the heating element 30 is composed of titanium nitride. The metal nitride structure 32 has a thickness that is greater than the total thickness of the optical resonator 12. Metal nitride structure 32 has a thickness such that the metal nitride structure 32 is not transparent. In one embodiment, the metal nitride structure 32 can have a thickness from 100 nm to 1000 nm.

Reference will now be made to the plots of reflectance (arbitrary units (a.u.)) vs. wavelength (nm) shown in FIGS. 3A, 3B and 3C. These plots were generated utilizing a SLM as shown in FIG. 1 including an optical resonator 12 composed of a film stack of a first cladding layer of SiN 14, a layer of GST 16, and a second cladding layer of SiN 18. A TiN heating element 20 is located on the front side, FS, of the optical resonator 12. The GST used in generating the plots shown in FIGS. 3A, 3B and 3C was $Ge_2Sb_2Te_5$.

In these plots, different SiN film thicknesses (50 nm, 70 nm, 120 nm and 180 nm) for the second cladding layer 18 were used. FIG. 3A is for the case when the GST is in an amorphous state, FIG. 5B is for the case when the GST is switched to the crystalline state, and FIG. 3B shows the change in reflectivity when the GST is switched from the amorphous state to the crystalline state.

The reflectance is a calculation determined by a transfer matrix method. For these calculations, a loaded refractive index data was written from a database and the complex refractive index values for each material was interpolated into an array. An interface matrix was calculated which describes the propagation of light between two layers j and k using the Fresnel coefficients for each layer calculated from the refractive index data. A layer matrix L, describing the phase shift and absorption caused by each layer j is then calculated. The transfer matrix S describing the relation between the first and the last layer is dependent on both $I_{jk}$ and $L_{jk}$. The overall Fresnel reflection coefficient is determined by taking a ratio of the elements of the transfer matrix. The data was then plotted as shown in FIGS. 3A, 3B and 3C.

Figure 3A:
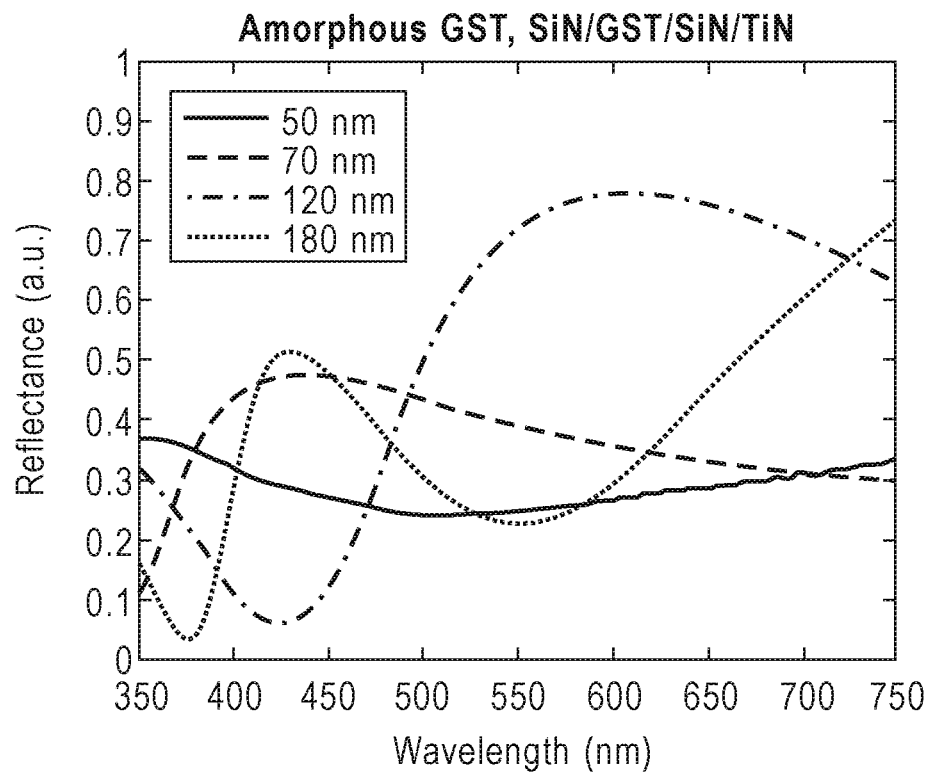
FIG. 3A is a plot of reflectance (arbitrary units (a.u.)) vs. wavelength (nm) for an optical resonator film stack of SiN/GST/SiN at different SiN film thicknesses and when the GST is in an amorphous state.
Figure 3B:
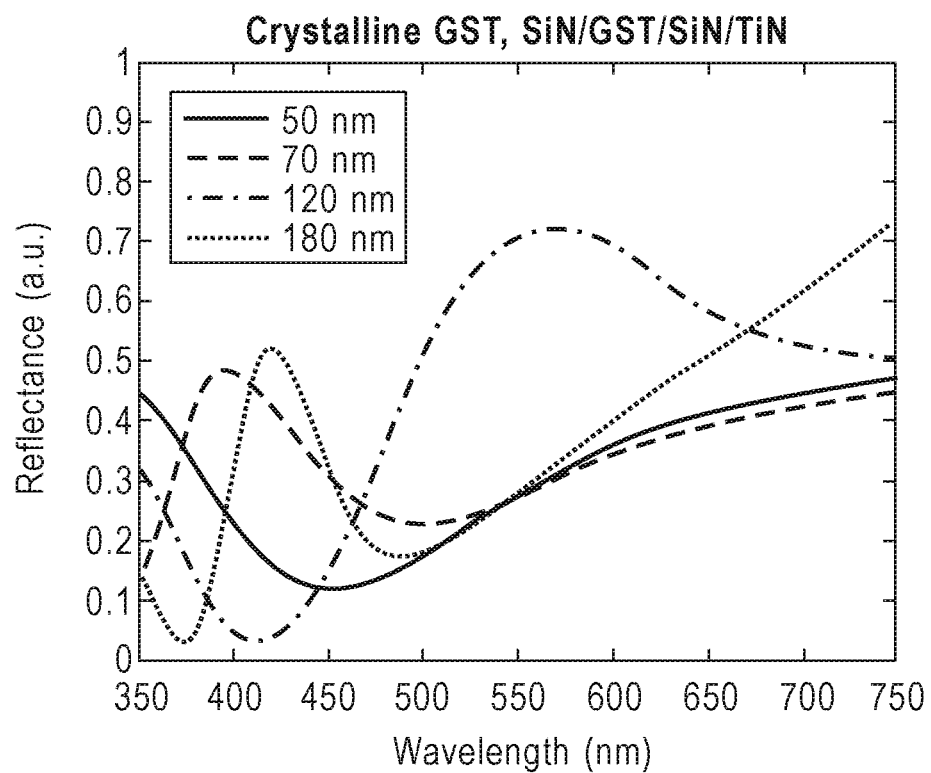
FIG. 3B is a plot of reflectance (arbitrary units (a.u.)) vs. wavelength (nm) for the optical resonator film stack of SiN/GST/SiN described in FIG. 3A at different SiN film thicknesses and when the GST is switched from the amorphous state to a crystalline state.
Figure 3C:
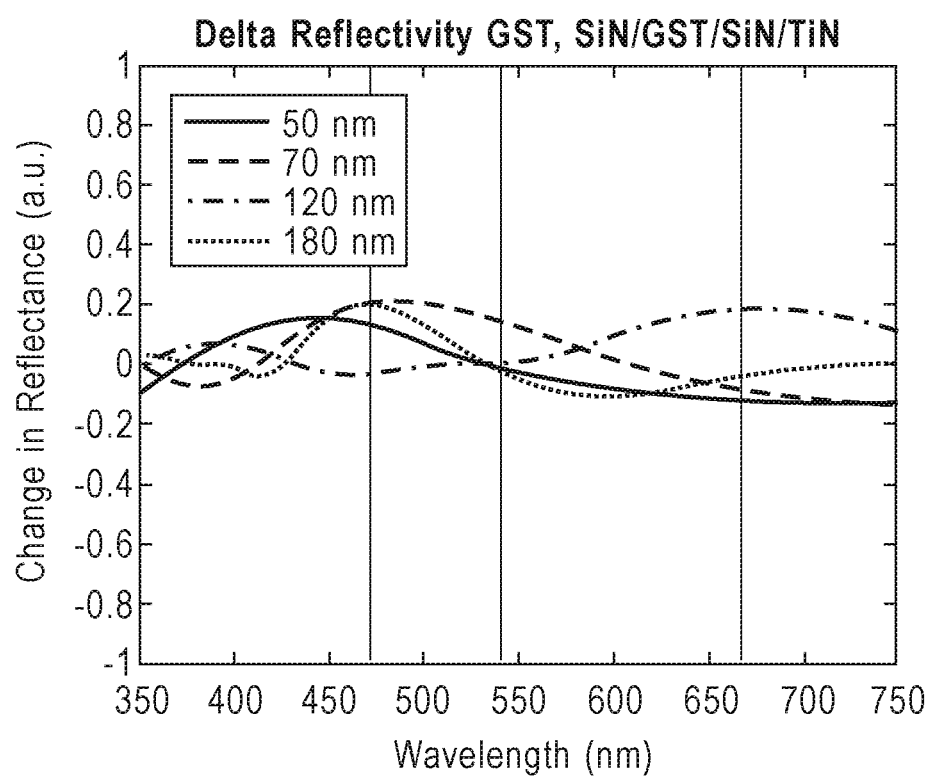
FIG. 3C is plot of change in reflectance (arbitrary units (a.u.)) vs. wavelength (nm) of the optical resonator film stack of SiN/GST/SiN described in FIGS. 3A-3B showing the change in reflectivity when the GST is switched from the amorphous state to the crystalline state.

The data in FIGS. 3A, 3B and 3C establishes the thickness of the cladding layer that is closest to the heating element can provide tunablity to the optical resonator 12 without exhibiting excess loss of light. The curves shown in FIGS. 3A, 3B and 3C establish that a strong reflectance in the visible wavelength range (400 nm to 700 nm) can be obtained with these optical resonators. Moreover, a significant change in the characteristics of the resonators can be observed (i.e. the curves in FIG. 3B are different from those in FIG. 3A). This difference shows that changing the phase of the $Ge_2Sb_2Te_5$ can allow the structures shown in FIGS. 1-2 to function as tunable antennas.

Figure 4:
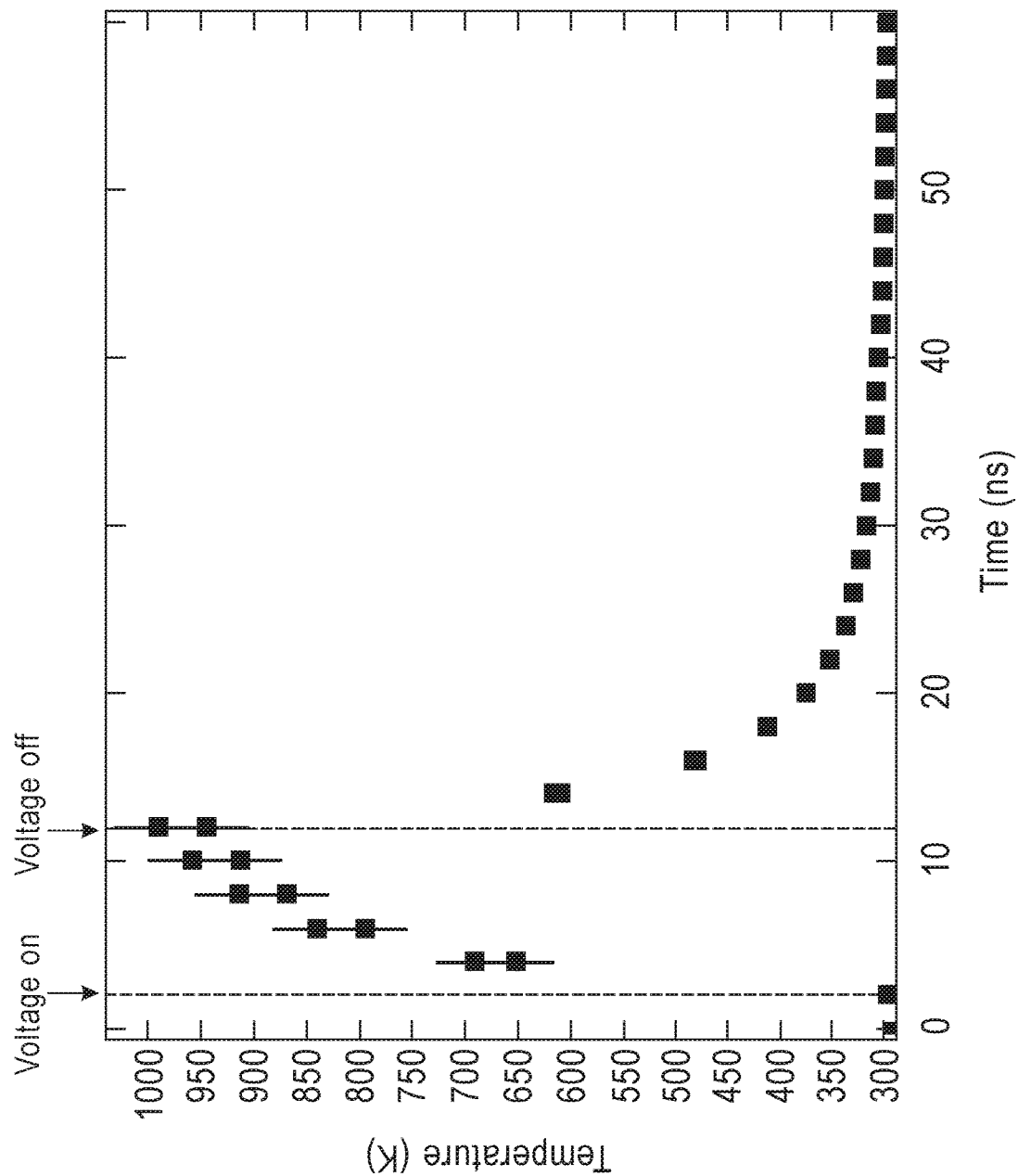
FIG. 4 is a plot of temperature (Kelvin, K) vs. time (nanoseconds, ns) for an optical resonator film stack of SiN/GST/SiN.

Referring now to FIG. 4, there is illustrated a plot of temperature (Kelvin, K) vs. time (nanoseconds, ns) for an optical resonator film stack of SiN/GST/SiN in accordance with the present application. This plot was generated utilizing a SLM as shown in FIG. 1 including an optical resonator 12 composed of a film stack of a first cladding layer of SiN 14, a layer of GST 16, and a second cladding layer of SiN 18. A TiN heating element 20 was located on the front side, FS, of the optical resonator 12. The GST used in generating the plot shown in FIG. 4 was $Ge_2Sb_2Te_5$. This plot establishes that silicon nitride (SiN) cladding layers in the optical resonator allow the GST PCM to be melt-quenched quickly enough to undergo the crystalline to amorphous transition. Notably, FIG. 4 shows, the GST present in the optical resonator 12 can cool from approximately 1000 K (the melting temperature of $Ge_2Sb_2Te_5$) to nearly room temperature in just 10 ns. This cooling time is faster than the about 30 ns that is required to melt-quench the material.

To switch the state of the optical resonator film stack of SiN/GST/SiN, a voltage pulse was applied to the TiN heating element 20. The heat propagated from the TiN heating element 20, through the second cladding layer of silicon nitride 18, and to the layer of phase change material 16, i.e., the $Ge_2Sb_2Te_5$ alloy for this example. The vertical extent of the points plotted in FIG. 4 represents the temperature distribution across a 7 nm $Ge_2Sb_2Te_5$ film. The cooling time constant is approximately 10 ns, which is fast enough to convert the PCM film to its amorphous state. As thermal plot shows, for a 1 $\mu m^2$ pixel, a 20 mW pulse for 10 ns is sufficient to heat the PCM to greater than 900 K, the temperature needed to switch the phase of $Ge_2Sb_1Te_4$ from its' crystalline to amorphous state. This amount of power is also sufficient to induce the reverse phase change, which requires a lower temperature. The energy required for the 20 mW, 10 ns pulse is 200 pJ.

Figure 5:
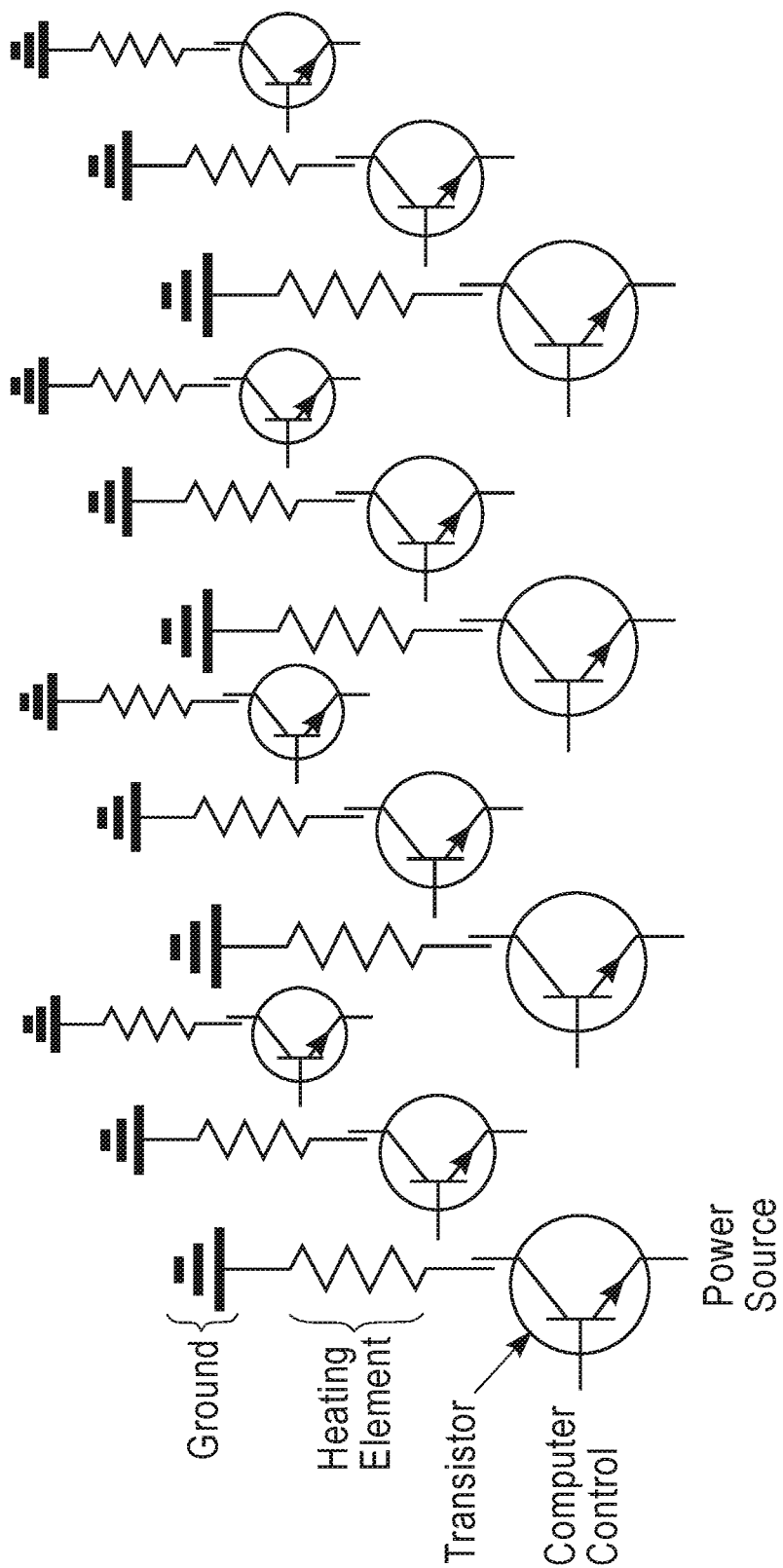
FIG. 5 is a two-dimensional array of spatial light modulators of the present application driven by a two dimensional array of transistors located on a back plane.

Referring now to FIG. 5, there is illustrated a two-dimensional array of spatial light modulators of the present application driven by a two dimensional array of transistors located on a back plane. A computer that calculates the image that is desired to be displayed on the SLM controls the gates of each of the transistors. The source of the transistors is attached to a power supply.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A spatial light modulator comprising:
   an optical resonator comprising a layer of a phase change material sandwiched between a first cladding layer of silicon nitride and a second cladding layer of silicon nitride;
   an electrode located along an entirety of a bottommost surface of the first cladding layer of the optical resonator; and
   a heating element composed of a metal nitride located on a topmost surface of the second cladding layer of the optical resonator, wherein the heating element is located in a cavity of a metal nitride structure that is located on the topmost surface of the second cladding layer, wherein the bottommost surface of the first cladding layer represents a back side of the optical resonator and the topmost surface of the second cladding layer represents a front side of the optical resonator.

2. The spatial light modulator of claim 1, wherein the electrode forms an interface with the bottommost surface of the first cladding layer, and the heating element forms an interface with the topmost surface of the second cladding layer.

3. The spatial light modulator of claim 1, wherein the electrode is composed of a thermally conductive metal or metal nitride.

4. The spatial light modulator of claim 3, wherein the thermally conductive metal or metal nitride that provides the electrode is composed of platinum.

5. The spatial light modulator of claim 1, further comprising a protective layer of silicon nitride located on a surface of the heating element.

6. The spatial light modulator of claim 1, wherein the phase change material is a chalcogenide.

7. The spatial light modulator of claim 6, wherein the chalcogenide is a GeSbTe alloy (GST), a SbTe alloy, GeTe alloy, an InSe alloy or a AgInSbTe alloy.

8. The spatial light modulator of claim 1, wherein the metal nitride is titanium nitride.

9. A spatial light modulator comprising:
   an optical resonator comprising a layer of a phase change material sandwiched between a first cladding layer of silicon nitride and a second cladding layer of silicon nitride;
   a heating element composed of a metal nitride located on a back side of the optical resonator, and a front side of the optical resonator is physically exposed; and
   a metal nitride structure located on the front side of the optical resonator and laterally surrounding the optical resonator, wherein an outermost sidewall of each of the phase change material, the first cladding layer and the second cladding layer is in direct physical contact with the metal nitride structure.

10. The spatial light modulator of claim 9, wherein the metal nitride structure has a height that is greater than a height of the optical resonator.

11. The spatial light modulator of claim 9, wherein the phase change material is a chalcogenide.

12. The spatial light modulator of claim 11, wherein the chalcogenide is a GeSbTe alloy (GST), a SbTe alloy, GeTe alloy, an InSe alloy or a AgInSbTe alloy.

13. The spatial light modulator of claim 9, wherein the metal nitride is titanium nitride.

14. The spatial light modulator of claim 9, wherein each of the first cladding layer and the second cladding layer has a thickness from 10 nm to 1000 nm, and the layer of the phase change material has a thickness from 5 nm to 200 nm.

15. The spatial light modulator of claim 1, wherein each of the first cladding layer and the second cladding layer has a thickness from 10 nm to 1000 nm, and the layer of the phase change material has a thickness from 5 nm to 200 nm.

\* \* \* \* \*